United States Patent [19]

Cobbs, Jr. et al.

[11] Patent Number: 4,574,005

[45] Date of Patent: Mar. 4, 1986

[54] CONTINUOUS COATER SOLVENT RECOVERY PROCESS

[75] Inventors: Walter H. Cobbs, Jr., Amherst; Robert J. Huddleston, Bay Village, both of Ohio; Robert A. Guldner, San Francisco, Calif.

[73] Assignee: Nordson Corporation, Amherst, Ohio

[21] Appl. No.: 643,103

[22] Filed: Aug. 22, 1984

Related U.S. Application Data

[63] Continuation of Ser. No. 545,600, Oct. 26, 1983, abandoned, which is a continuation of Ser. No. 363,091, Mar. 29, 1982, abandoned.

[51] Int. Cl.$^4$ .............................................. B01D 53/14
[52] U.S. Cl. .......................................... 55/48; 55/51; 55/53; 55/89
[58] Field of Search ................... 55/48, 50, 51, 53, 84, 55/85, 89, 90, 228, 240, 241, DIG. 46; 98/115 SB; 118/326

[56] References Cited

U.S. PATENT DOCUMENTS

2,349,562  5/1944  Rosenthal .
2,413,503  12/1946  Katz .
2,652,129  9/1953  Benedict .
2,765,872  10/1956  Hartman et al. .
2,848,353  8/1958  Norris .
2,849,150  8/1958  Tompkins, Jr. .

(List continued on next page.)

FOREIGN PATENT DOCUMENTS

1250343  10/1971  United Kingdom .
1438847  6/1976  United Kingdom .

OTHER PUBLICATIONS

R. D. Pruessner et al, "Air Pollugion Control: Hydrocarbon Emission Reduction Systems", *Chem. Eng. Prog.*, Aug. 1977, pp. 69–73.

C. A. Bulkeley, "Adsorption, Absorption & Condensation in Recovery of Solvents", *Chem. & Metall. Engin.*, vol. 45, Jun. 1938, pp. 300–301.

E. D. Milligan et al., "Distillation and Solvent Recovery", *Ameri. Oil Chem. Society Jour.*, Aug. 1974, pp. 347–350.

J. W. Drew, "Design for Solvent Recovery", *Chem. Eng. Progress*, vol. 71, No. 2, Feb. 1975, pp. 92–99.

P. Adler, Brown & Root, Inc., "Right Absorber Lean Oil Cuts Operating Costs", *Chem. Eng.*, Dec. 5, 1977, pp. 125–130.

*Primary Examiner*—Robert Spitzer
*Attorney, Agent, or Firm*—Wood, Herron & Evans

[57] ABSTRACT

A process for the recovery of solvent entrained in a water vapor laden exhaust gas stream exhausted from a spray painting system is disclosed. The process includes an oil absorption unit which absorbs and removes all but about 100 parts per million of the solvent from the exhaust gas stream while permitting air and water vapor to be vented from the system and a stripper which in turn removes all but about 0.001 mole fraction of any one solvent component trapped in the oil. The oil, which is substantially free of solvent, is returned to the absorption unit. The stripped solvent can then be condensed and reused by mixing it with the paint solids to be sprayed in the process; or, alternatively, it can be admitted as a vapor into the atmosphere surrounding a workpiece which is being coated in the spray painting system to raise the solvent humidity surrounding the workpiece to above about 70%. By raising the solvent humidity to above about 70% caking of paint on the interior surfaces of the spray booth, plugging of the paint spray nozzles, and rapid evaporation of solvent from the paint are reduced. The present process provides a means to recover and reuse even a complex mixture of solvents where the recovered solvent comprises a mixture of the same components in the same ratio as the solvent mixture originally used in the paint spray system. The system is described in relation to a continuous coater wherein parts to be coated move continuously through an enclosed paint spray area and are coated while the solvent laden atmosphere therein is exhausted from the coater for recovery of the solvent.

9 Claims, 6 Drawing Figures

U.S. PATENT DOCUMENTS

| | | |
|---|---|---|
| 2,861,897 | 11/1958 | Hendrixson . |
| 3,011,914 | 12/1961 | Pflug . |
| 3,015,576 | 1/1962 | Hendrixson et al. . |
| 3,030,913 | 4/1962 | Arnold et al. . |
| 3,042,547 | 7/1962 | Pickett . |
| 3,073,721 | 1/1963 | Pokorny . |
| 3,131,228 | 4/1964 | Moon . |
| 3,266,262 | 8/1966 | Moragne . |
| 3,338,738 | 8/1967 | Lindemann . |
| 3,503,854 | 3/1970 | Good . |
| 3,539,381 | 11/1970 | Kayarian . |
| 3,551,189 | 12/1970 | Gray, Jr. et al. . |
| 3,597,257 | 8/1971 | Dunn, Jr. . |
| 3,648,436 | 3/1972 | Schonewald et al. . |
| 3,714,790 | 2/1973 | Battey . |
| 3,739,551 | 6/1973 | Eckert . |
| 3,750,622 | 8/1973 | Repp et al. . |
| 3,807,291 | 4/1974 | Roberts et al. . |
| 3,914,277 | 10/1975 | Wood . |
| 3,932,151 | 1/1976 | Lau . |
| 3,963,461 | 6/1976 | Stockford et al. ................ 55/84 X |
| 3,981,156 | 9/1976 | Modisette et al. . |
| 4,007,304 | 2/1977 | Dunn, Jr. et al. . |
| 4,010,010 | 3/1977 | Ward . |
| 4,028,072 | 6/1977 | Braun et al. ....................... 55/228 X |
| 4,042,734 | 8/1977 | Wiggins . |
| 4,043,769 | 8/1977 | Nishino et al. .................... 55/89 X |
| 4,054,429 | 10/1977 | Ostojic et al. ......................... 55/48 |
| 4,054,692 | 10/1977 | Monmarson . |
| 4,101,297 | 7/1978 | Uda et al. .......................... 55/48 X |
| 4,102,303 | 7/1978 | Cordier et al. .................... 55/228 X |
| 4,102,983 | 7/1978 | Yamase et al. ..................... 55/84 X |
| 4,257,783 | 3/1981 | Gutjahr et al. . |
| 4,261,707 | 4/1981 | Bradshaw et al. ....................... 55/48 |
| 4,265,642 | 5/1981 | Mir et al. ........................... 55/48 X |
| 4,265,944 | 5/1981 | Garner ................................ 55/48 X |
| 4,313,369 | 2/1982 | Tsuruta et al. ................. 98/115 SB |
| 4,338,364 | 7/1982 | Kennon et al. ............. 98/115 SB X |
| 4,353,715 | 10/1982 | Mir et al. .................... 98/115 SB X |

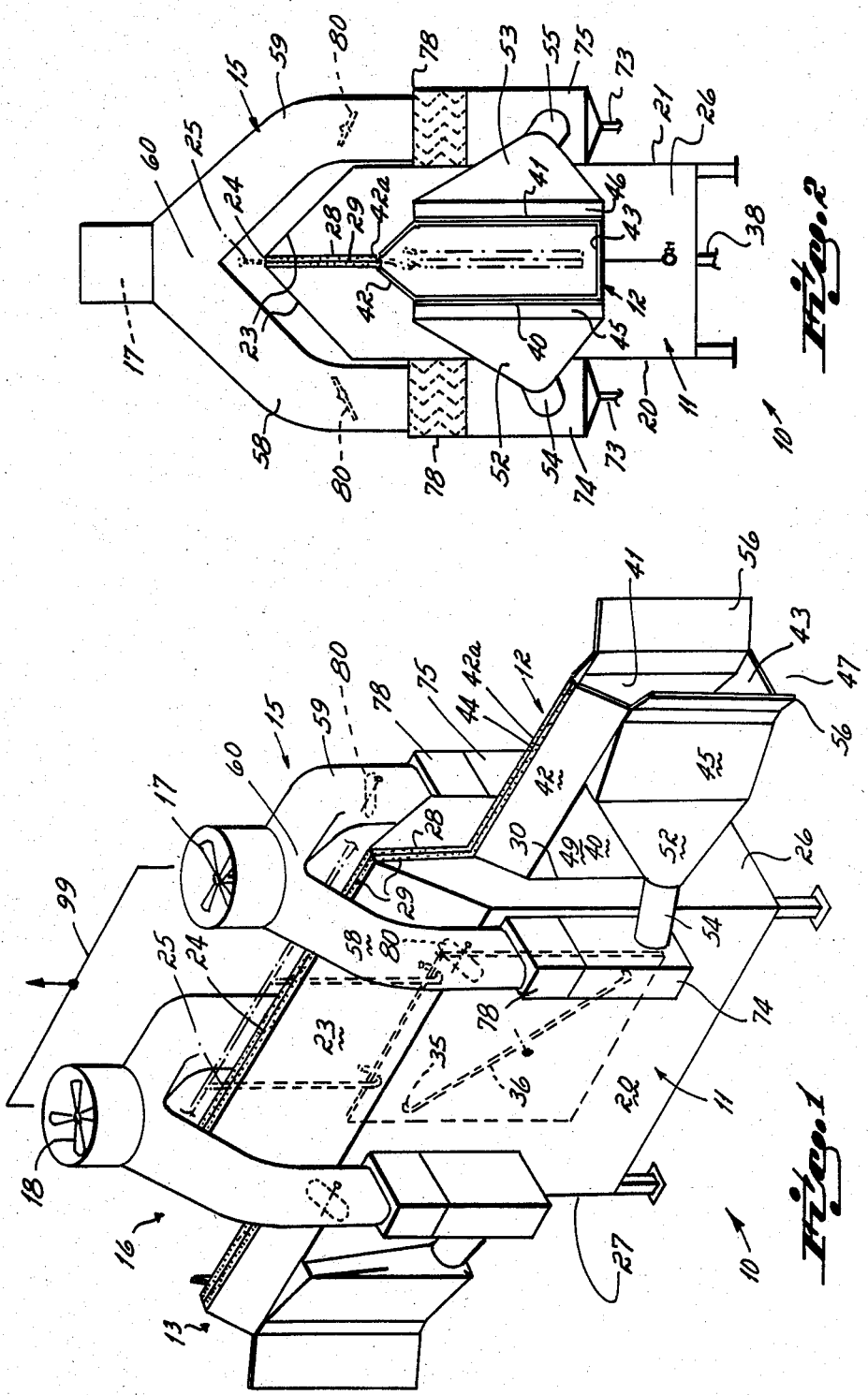

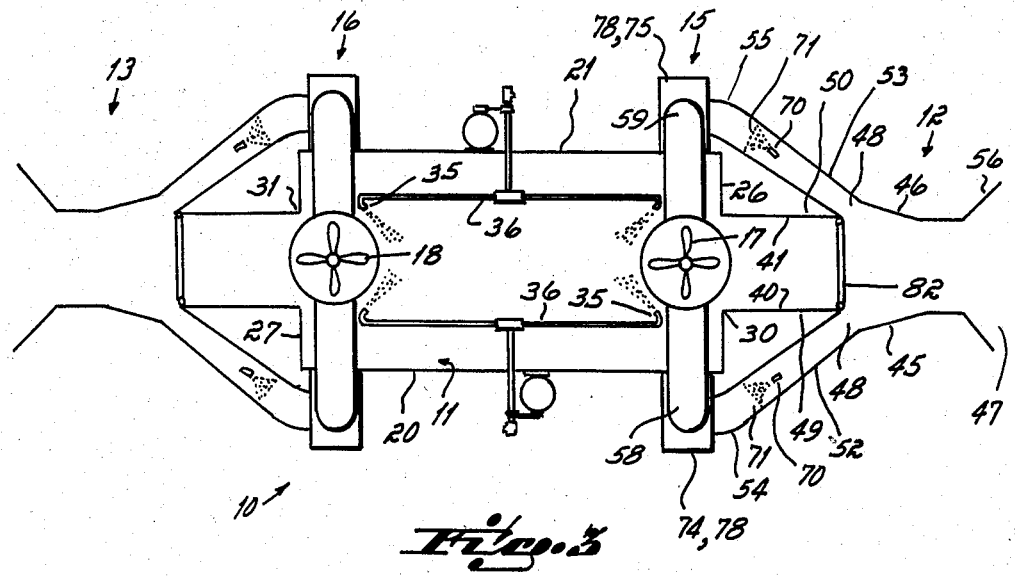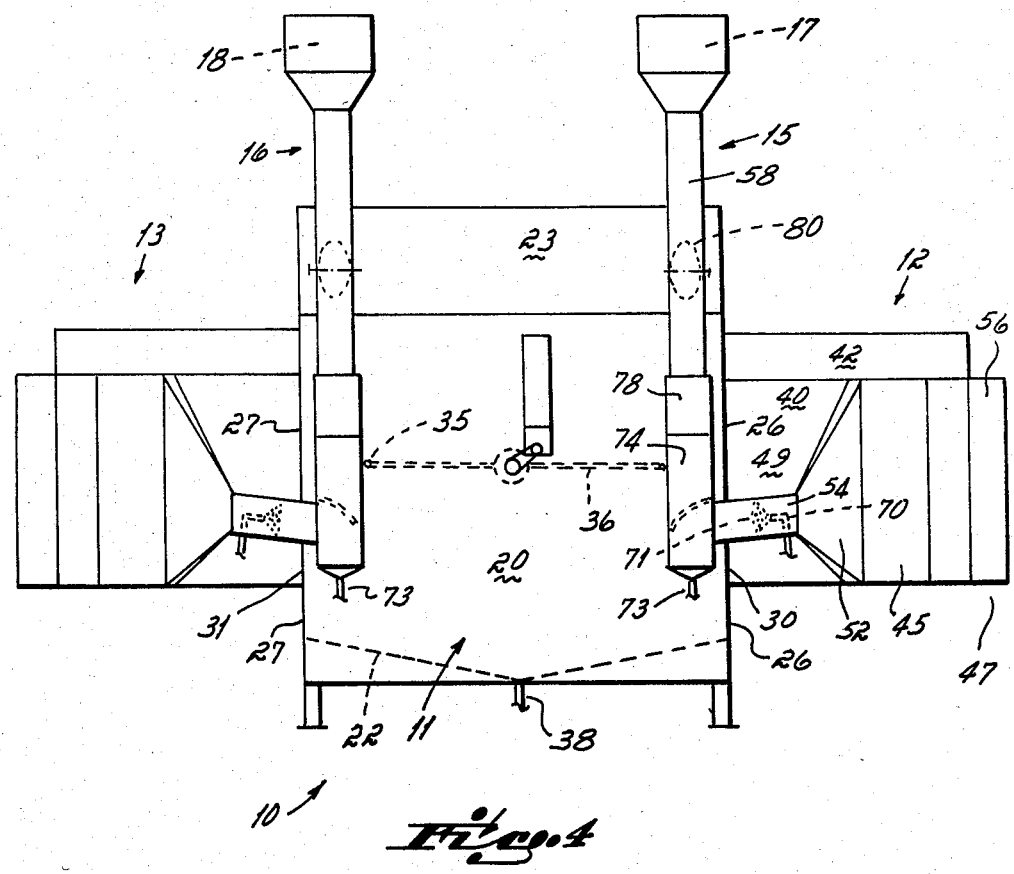

CONTINUOUS COATER SOLVENT RECOVERY PROCESS

CROSS-REFERENCE TO RELATED APPLICATIONS

This application is a continuation of U.S. Ser. No. 545,600, filed Oct. 26, 1983, now abandoned, which is a continuation of U.S. Ser. No. 363,091, filed Mar. 29, 1982, now abandoned.

BACKGROUND OF THE INVENTION

The present invention relates to a process for recovering solvents contained in a moisture laden exhaust gas stream exhausted from a paint spraying system. More specifically, it relates to such a process of solvent recovery used in combination with a continuous wet paint spray system using a complex mixture of solvents as a carrier for the coating or paint solids whereby this mixture of solvents is recovered in substantially the same ratio of components as previously used and is substantially free of water. The process operates at gas flow rates of 500 to 50,000 scfm with the exhaust gas stream entering the recovery process being 90% saturated with water to reduce the solvent vented from the system to less than about 200 ppm and, preferably, 100 ppm.

Coating or painting systems generally provide a means to apply a resinous coating material, referred to as coating solids, onto a workpiece. Wet coating systems apply the coating solids by dissolving the solids in a solvent or mixture of solvents and applying the formed solution onto the workpiece, e.g., by spraying the solution onto a workpiece from one or more spray nozzles. The solvent is then evaporated from the workpiece leaving a dry film of solid coating material adhering to the surface of the workpiece. The nature of many of the modern coatings or paints requires many different components and, in particular, a range of different solvents. These components are added in predetermined amounts by the paint formulator, and the proper components in the proper ratio must be present for the paint to perform optimally. Furthermore, with certain coatings, the solvent solutions must not contain water if they are to function properly. These solvents are also relatively expensive considering the quantity used.

One of the most serious problems encountered with spray coating systems and, particularly, with continuous coating systems is that of containing the material overspray and solvent vapors within the spray cabinet or booth in which the workpiece is coated so that they do not escape to the atmosphere. In a continuous coater which has open entrance and exit ports through which the continuously moving line of pieces to be coated moves, these ports are never closed during the spray cycle so that it is difficult to prevent airborne spray material and/or solvent vapors from escaping through these ports. The problem is compounded by the fact that the moving workpieces create air currents which tend to drag airborne overspray and solvent vapors which are heavier than air out of the coater cabinet. Moreover, fresh air tends to cling to the parts as they move into the coater and is "dragged in" with the parts lowering the internal solvent humidity.

A method to prevent material overspray and solvent vapors from escaping to the atmosphere through the entrance and exit ports is to add vestibules to the entrance and exit ports of the continuous coater which extend outwardly both from the entrance port and the exit port. These vestibules are connected to an exhaust system including an exhaust fan which is operable to pull outside air into the vestibule in sufficient quantities and at a sufficient velocity to effectively form a barrier to the egress of oversprayed material from the vestibules. To avoid emitting airborne paint solids through the exhaust to the atmosphere, water scrubbers have been employed in which the paint solids particles in the exhaust are trapped in a water spray and collected for disposal or recycle processing reuse. In a continuous coating system, the exhaust may be a gaseous stream flowing at a rate of less than about 50,000 scfm, e.g., 2500 scfm. This exhaust comprises ambient air drawn from the outside, vapor of the solvent used as a carrier for the paint solids at a rate of 4 to 15 gallons per hour (700-2625 ppm solvent vapor per hour) and water vapor at approximately 90% of saturation. The water vapor in the exhaust stream which exceeds ambient levels is present due to the water used in the scrubbers and is a by-product of the water scrubbing system.

In prior art systems of various types where organic vapors are present, these vapors are typically displaced to the atmosphere at 2500 ppm which is the safe flammable level under existing fire codes. However, in typical continuous coater systems as described above, the exhaust gas contains less than about 2500 ppm solvent vapor as it leaves the water scrubber. It is undesirable to exhaust the 2500 ppm of solvent in the exhaust gas into the atmosphere due to environmental concerns. Furthermore for economical reasons, it is highly desirable to collect and reuse the solvent.

Two problems are encountered in attempting to recover and reuse the solvent vapor as it exits the water scrubbers. First, the exhaust gas stream is highly saturated with water vapor, frequently up to 90% of saturation or more. Many solvents used in paint applications are extremely water sensitive and the presence of substantial amounts of water fouls the paint spray system. Second, the high degree of water saturation also prevents the use of certain known solvent recovery methods such as refrigeration methods since the water tends to freeze forming excessively high amounts of ice which fouls the recovery system and carbon beds since the presence of water reduces the available surface contact area drastically reducing the efficiency of the beds. To operate a carbon bed above about 80% relative humidity requires warming of the exhaust gas stream which lowers the overall efficiency of the process.

In addition, paint performance is extremely sensitive to the ratio of solvents in the paint and, thus, the solvent mixture which is recovered desirably should have the same ratio of component solvents as the solvent mixture originally employed. With today's complex paint formulations, the solvent mixtures can be a complex mixture of 8 to 12 different solvents that are designed to function with a particular paint solid. If the ratio of any of the components is substantially altered, the coating material will not necessarily perform in the desired manner. Therefore, a recovery system must not only effectively recover a wide range of solvents but must do so in the same ratio as originally formulated. Furthermore, an economical problem can be encountered when attempting to recover solvents in a stream of gas when the flow rate of the gas stream is less than about 5000 scfm. At such low flow rates, certain economies of size which make some solvent recovery systems efficient at high flow rates are not available. Accordingly, at these

SUMMARY OF THE INVENTION

Accordingly, it is among the principal objectives of the present invention to provide a method of recovering a solvent or mixture of solvents which is dispersed in a stream of exhaust gas (1) which is highly saturated with water vapor, e.g., 90% or more of saturation (2) at gas flow rates of about 500 to 50,000 scfm, and (3) to reduce the solvent level vented to the atmosphere to less than about 200 ppm and, preferably, 100 ppm while recovering the balance for reuse. To this end, the present invention comprises a process for recovering the solvents in an exhaust gas from a spray system such as a continuous coater by means of subjecting the solvent laden exhaust gas to an absorption process which employs a hydrophobic absorption medium and which absorbs all but about 200 ppm of the solvent vapor in the exhaust stream. The invention further comprises separating the solvent from the hydrophobic absorption medium by entraining the solvent in a dry, inert gas and returning the hydrophobic absorption medium to the absorption process wherein this returned absorption medium contains less than about 0.001 mole fraction of any one solvent component. The invention further comprises obtaining a solvent vapor stream substantially free of water and free of said hydrophobic absorption medium.

Furthermore, it is an object of the present invention to provide a process for recovering a mixture of solvents in such a manner that the recovered solvent mixture comprises substantially the same proportion of component solvents as the solvent mixture originally used as a carrier in the paint spray system. This allows one to add the recovered solvent mixture directly to a solids-solvent mixture without substantial treatment of the recovered solvent mixture or the need to add any components to the solvent mixture and without altering the chemistry of the formulation.

Still further, it is an object of the present invention to provide a solvent recovery system for use in combination with a continuous coater wherein the recovered solvent may be introduced directly into the spray booth itself to keep the solvent atmosphere within the booth surrounding the workpiece at 80±10% of saturation. This provides several advantages in addition to overcoming certain problems in the prior art systems which presently provides little or no control of solvent humidity and which typically operate at 20 to 40% of solvent saturation. That is, we have found that by increasing the solvent vapor humidity from normally 20–40% of solvent saturation to 70–90%, buildup of dried paint on the spray nozzles and the inside walls of the paint spray booth is greatly reduced. This prevents plugging of the spray nozzles which would otherwise affect performance, substantially reduces the need for maintenance, i.e., the need to open up the coater and manually scrape off dried cakes of paint which may be several inches thick, and reduces loss of paint solids as waste. In addition, a high solvent humidity reduces the solvent evaporation rate from the coating on the part thereby maintaining the applied coating in a fluid state for a longer period of time. This enables the use of more volatile or faster evaporation rate solvents thereby eliminating or reducing the need for adding slower evaporation rate solids such as are now used typically in amounts up to 20% of the solvent composition. The use of more volatile solvents is preferred, but presently is generally impractical since the applied coating must remain fluid for a certain period of time after application to properly coat the surface of a workpiece. In the past, this has been accomplished by using less volatile solvents which as a result required lengthened drying times. The present invention enables the recycling of a solvent mixture which is substantially the same as the solvent vapor mixture evaporated from the carrier of the paint solids. Thus, the recycled solvent can be introduced as a vapor into the interior of the spray booth to increase the solvent humidity of the internal atmosphere of the booth where the workpiece is being sprayed. This shifts the vapor-liquid equilibrium of the system and forces the solvent mixture used as a carrier for the paint solids to remain fluid for a longer period of time. Thus, a solvent mixture made up of more volatile solvents can be used. This allows the paint to be dried more quickly after the workpiece is removed from the booth thereby decreasing work time and energy requirements. Moreover, improved appearance and coverage is obtained as well as material savings by the lower coating weights required. One restriction with respect to solvent humidity is that it must not be so great that the solvent condenses on the workpieces as they enter the booth.

In a presently preferred form of the invention, the solvent recovery system of the present invention is used to recover solvents which are exhausted as vapors from a continuous coater which employs a water scrubbing system to remove paint solids from the exhaust gas stream. The continuous coater is provided with coating material, i.e., paint from a supply source or paint reservoir which is typically a 55 gallon drum. Coating material contained within the reservoir is pumped through a line into the continuous coater where it is applied to workpieces which are carried into, through and out the coater in a continuously moving line. The coater is provided with a drain which communicates back to the paint reservoir so that oversprayed paint can be collected in the coater and returned to the paint reservoir to be reused. A solvent supply is provided in communication with paint reservoir to add solvent to the paint to decrease the viscosity of the paint contained in the reservoir as required. That is, the paint reservoir typically contains paint with a viscosity of 120 centipoise. Solvent is added to lower the viscosity to 20 centipoise before spraying in the coater.

Exhaust fans continuously exhaust the vestibules of the coater and force the exhaust gas stream into a water scrubber system where water spray entrains the paint particles and washes them out of the gas stream. This water raises the humidity of the gas stream to 90% relative humidity.

The gas stream is then conducted to the first stage of the recovery process which comprises an oil absorption unit. In this unit, oil flows downwardly through the absorber, absorbing the solvent in the exhaust gas which flows upwardly through the absorber, i.e., in a direction opposite that of the oil flow. The oil presently used is white mineral oil which is effective in absorbing all but about 100 ppm or 90% removal of the solvent in the gas stream whichever is less.

The solvent-laden oil is then heated to about 300° F. and is then introduced into the second stage of the recovery process which comprises a stripper. In the stripper, the solvent evaporates into a counterflowing stream of inert dry gas such as air which carries the solvent out of the top of the stripper. The hot oil is stripped of solvent components down to a level of about 0.001 mole fraction as it exits the bottom of the stripper. The oil stream now stripped of solvent is cooled to about 86° F. and returned to the absorber where it is used again to absorb the solvent in the absorber. The solvent vaporized into the air in the stripper exits the top of the stripper and can be used as a vapor to increase the solvent humidity in the coater to 70–90% of saturation by bleeding the solvent vapor into the coater atmosphere or it may be condensed and added to the solvent supply for reuse.

Other objects and advantages of this invention will be readily apparent from the following description of the drawings in which:

BRIEF DESCRIPTION OF THE DRAWINGS

FIG. 1 is a perspective view of a continuous coater incorporating an air flow control vestibule;

FIG. 2 is an end elevational view of the continuous coater illustrated in FIG. 1;

FIG. 3 is a diagrammatic top plan view of the continuous coater illustrated in FIGS. 1 and 2;

FIG. 4 is a side elevational view of the continuous coater illustrated in FIGS. 1–3;

DETAILED DESCRIPTION OF THE INVENTION

Figure 5:
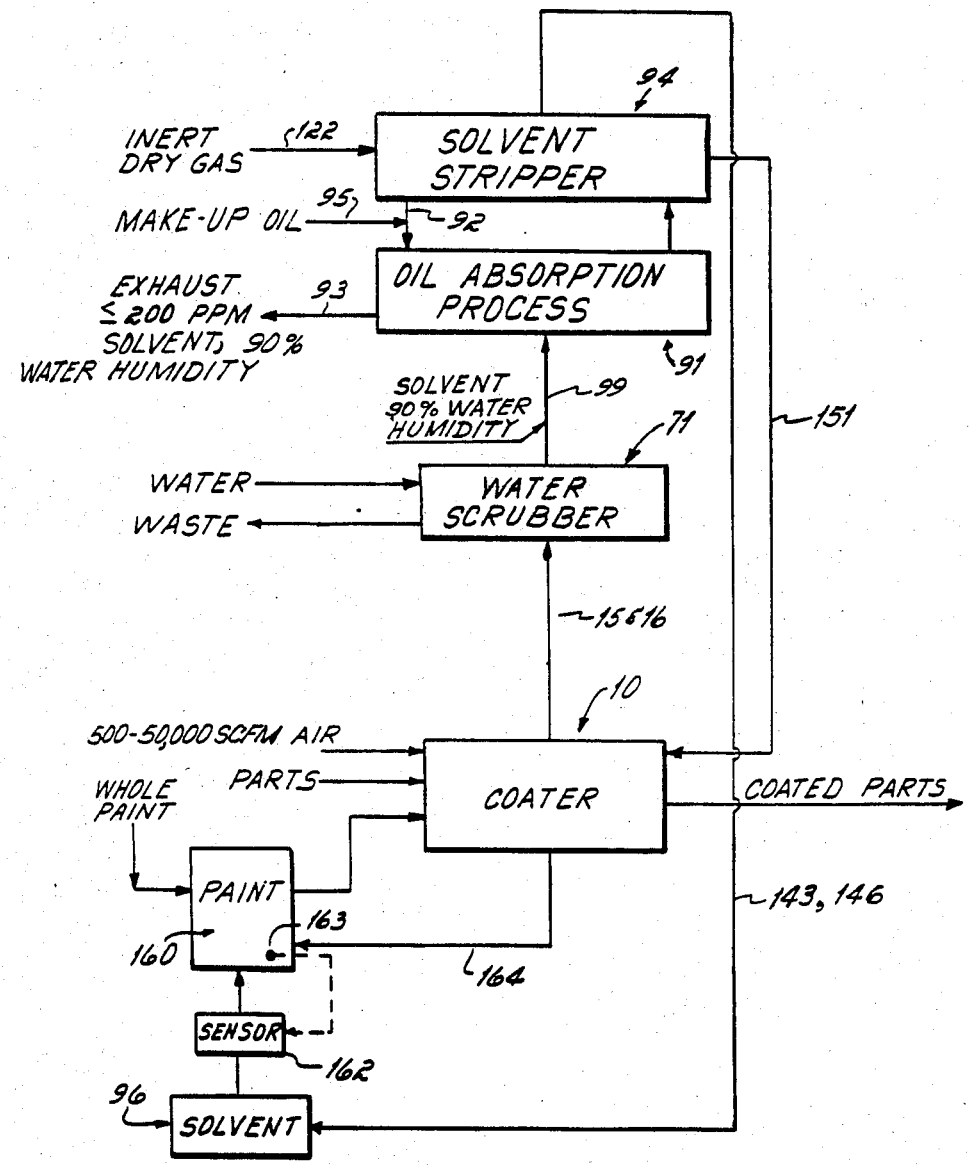
FIG. 5 is a simplified block flow diagram of the process of the present invention.

Referring to FIGS. 1–4, there is illustrated a preferred embodiment of a continuous coater for use in combination with the process of the present invention. This coater is described in detail in U.S. Pat. No. 4,338,364 issued on July 6, 1982 and assigned to the assignee of this invention. That description is incorporated herein by reference, but for purposes of the detailed description of this invention is described as follows.

The coater 10 comprises a coating booth or cabinet 11 having vestibules 12 and 13 extending from opposite ends through which workpieces to be coated interiorly of the booth enter and exit from the booth. The vestibules 12, 13 are connected through duct systems 15, 16 to the solvent recovery system illustrated in FIGS. 5 and 6 via suction fans 17, 18 respectively.

The coater booth 11 comprises a pair of side walls 20, 21, a downwardly sloping bottom wall 22, a ceiling 23 slotted at the top as indicated at 24 to permit the passage of conveyor suspension hooks 25 through the ceiling, and end walls 26, 27. The end walls are also slotted as indicated at 28 for the passage of the conveyor hooks through those walls. Additionally, the end walls 26, 27 have exit 30 and entrance 31 ports formed therein through which product suspended from the conveyor hooks 25 may pass into and out of the booth.

The slots 24 in the ceiling and the slots 28 in the end walls are closed by overlapping pliable strips 29 which close across the top and end wall slots of the coater cabinet so as to permit entry of the conveyor hooks 25 but limit overspray and solvent vapor escape from the cabinet and air entrance to the cabinet through the slots. In the continuous coater illustrated in FIGS. 1–4, paint or other coating material is pumped from a coating material reservoir via a hydraulic pump to a heater (not shown) and to rotating nozzles 35 mounted on the ends of rotating spray arms 36. Paint is pumped from the reservoir to these arms under high pressure and is forced through the nozzles as an atomized spray. Coating material which is not applied to the work falls to the bottom 22 of the coater booth where it is drained away through a siphon port 38 by a scavenger pump (not shown) and returned to the reservoir via a paint return line.

The two vestibules 12, 13 are identical. One vestibule 12 which is located adjacent the exit port 30 of the booth will be described in detail. It will be understood that an identical vestibule 13 surrounds the entrance port 31 and is attached to the opposite end 27 of the booth. The vestibule 12 functions as an enclosed passageway through which workpiece may exit the spray cabinet 11. It has a pair of side walls 40, 41, a ceiling 42, and a floor or bottom wall 43. These walls 40, 41, 42 and 43 all are sealingly attached to the end wall 26 of the cabinet 11.

The ceiling 42 is longitudinally slotted as shown at 42a to facilitate the passage of the conveyor suspension hooks 25 through the vestibule. As in the case of the passage 24 in the spray cabinet, the slot 42a is closed by overlapping pliable strips 44 which extend across the slot. The pliable strips permit the passage of conveyor hooks but limit overspray and solvent vapor from escaping through the slot to the atmosphere and additionally function to prevent the ingress of air into the vestibule through the slot 42a.

A central section of each of the side walls 40, 41 of the vestibule taper outwardly from adjacent the outer end 47 of the vestibule so as to provide a rectangular air collector passage 48 on each side of the vestibule. These air collector passages 48 are defined by the outwardly flared sections 45, 46 of the side walls, the unflared side wall sections 49, 50 as well as the ceiling 42 and bottom walls 43 of the vestibules. Each of these rectangular collector slots 48 is connected by a funnel-shaped section of conduit 52, 53 to a circular duct 54, 55 respectively. The funnel-shaped sections of ducts 52, 53 are rectangular at the input end which is connected to the air collector slot 48 and are circular at their output end at which point they are connected to the circular ducts 54, 55.

At the outer ends, the vestibule's side walls 40, 41 preferably have an outwardly extending flange 56 which forms an extension of the side wall. These flanges extend at an angle of approximately 45° to the vertical plane of the side walls and serve as wind or draft deflectors at the outer opening of the vestibules.

The ducts 54, 55 extend in a generally horizontal direction but slope slightly downwardly. At the inner ends, each duct 54, 55 is connected to a vertical section of expansion chambers 74, 75 respectively which extend up the sides of spray cabinet 11 to baffle boxes 78 and through ducts 58, 59 respectively. At the upper end, each vertical section of duct 58, 59 is joined as illustrated at 60 and connected to the exhaust fan 17. When the fan 17 is operating, it is operative to pull air through the outer end 47 of the vestibule through the air collector slots 48 into the duct systems via the circular duct 54, expansion chamber 74, baffle box 78, conduit 58, circular duct 55, expansion chamber 75, baffle box 78, and conduit 59. This air movement forms a flow barrier at the outer end of the vestibule preventing the escape of oversprayed paint or solvents from the spray cabinet 11.

The coater for use in the present invention is equipped with a liquid scrubbing system for extracting any airborne paints or sprayed material from the exhaust air before it is supplied to the solvent recovery system. To that end there is included in each of the ducts 54, 55 a liquid spray nozzle 70 through which liquid is sprayed to create a liquid scrubber 71 within each of the ducts 54, 55. These liquid scrubbers 71 are effective to catch air entrained particles and cause those particles to run out of the duct system through a liquid outlet 73 to a separation tank (not shown).

At its upper end, each vertical duct 58, 59 contains a manually adjustable butterfly valve 80 for controlling the relative quantity of air pulled through each of the ducts 58, 59. Thus, it is possible by manually rotating the valves 80 to adjust the air flow through each of the ducts 58, 59 into balance, thereby insuring that there is a uniform flow of air through each of the collector slots 48 located on the opposite side of the vestibule 12.

Figure 6:
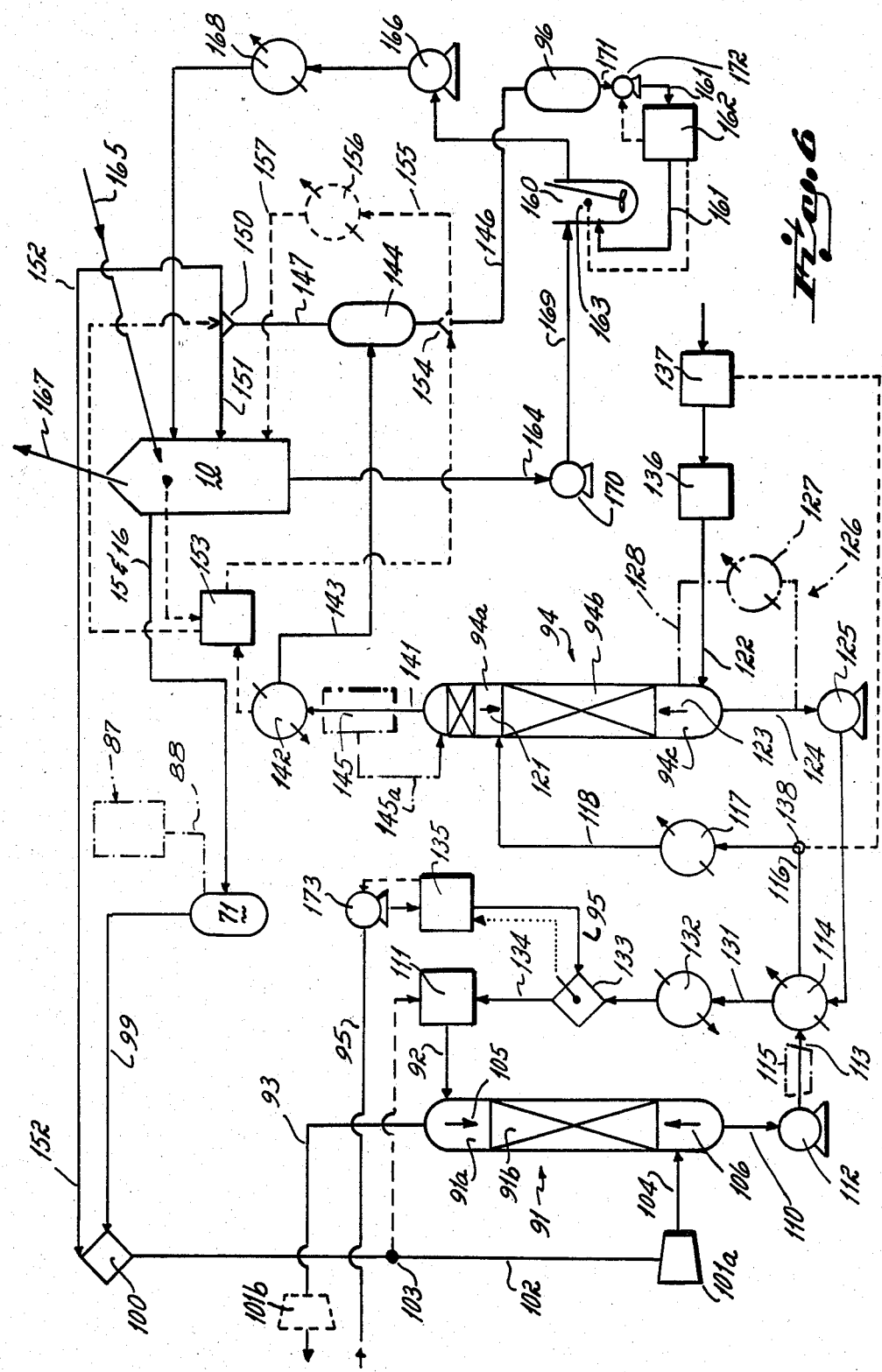
FIG. 6 is a detailed flow diagram showing a presently preferred embodiment of the present invention.

As depicted in FIG. 6, the coater may optionally include a flash tunnel 87 (not depicted in FIGS. 1–4) hermetically attached to the outer end 47 of the vestibule 12 which itself is attached to the exit port 30. The flash tunnel is connected to the outer end of vestibule 12 by means of a rigid duct (not shown). In this embodiment, the outwardly extending flanges 56 are not attached to the vestibule 12. Similar flanges can be attached to an exit port of the flash tunnel if desired.

The flash tunnel is a heated conduit through which the coated workpieces pass immediately after leaving the coater 10. In the flash tunnel, about 40% of the solvent is evaporated off the coated workpiece. Generally, its temperature is maintained at about 100° to 200° F. Since the flash tunnel is sealingly attached to the outer end 47 of the vestibule 12, the solvent vapor in the flash tunnel is drawn into the vestibule 12 by fan 17. Vapors are then pulled into the water scrubber also via conduits 54 and 56 diagrammatically depicted in FIG. 6 by line 88.

The vapors pulled through the scrubber are introduced into the novel solvent recovery system of the present invention. This solvent recovery system is a two stage process. The system is diagrammatically depicted in FIG. 5 in which block 10 represents the coater, block 71 represents the water scrubber used to prevent the emission of paint solids carried in exhaust ducts 15 and 16. As stated above, the exhaust ducts 15 and 16 comprise the conduits 54, 55, 58, 59 and 60 of coater shown in FIGS. 1–4. As previously disclosed, exhaust from the coater 10 is pulled through the water scrubber 71 in the ducts 15 and 16 from where it enters the first stage of the solvent recovery system through line 99.

As is shown in FIG. 5, this first stage is a counter flow oil absorption unit 91. Lean oil at approximately 86° F. is admitted through line 92 into the top of the packed tower absorption unit while exhaust gas is forced through line 99 into the bottom of the oil absorption unit 91. The downwardly flowing oil absorbs all but about 200 ppm, preferably 100 ppm or less, of the solvent. The purified exhaust gas, which is highly saturated with water vapor, i.e., on the order of 90% water humidity is exhausted through line 93 into the atmosphere.

The solvent rich oil is directed through a packed tower counterflow solvent stripper 94 into which an inert dry stripping gas is forced through the solvent stripper in the opposite direction of the flowing oil. This stripping gas removes the solvent from the oil. The lean oil is then returned to the oil absorber through line 92. Makeup oil can also be added through line 95 if needed.

The solvent carried by the stripper gas can be collected and used in several ways. The solvent can be condensed and added to the solvent supply 96 (through lines 143 and 146) or directed as needed as a vapor into the continuous coater 10 (through line 151 or 157) to increase the solvent humidity in the coater or proportionally between the solvent supply tank and the coater.

This solvent recovery process is further described in detail with reference to FIG. 6.

Specifically, the exhaust gas from the coater system 10 is pulled via ducts 15 and 16 through the water scrubbers 71 through fans 17 and 18 and flows through line 99 past or through junction 100 and to a compressor 101a via line 102. The gas in line 102 will generally be at about 85° F. and 14.6 psia. Line 102 includes a flow rate detector 103 to monitor the volume of gas passing through the line. Compressor 101a forces the solvent and moisture laden exhaust gas from line 102 through line 104 into and through the counterflow absorption unit 91.

OIL ABSORPTION UNIT

The oil absorption unit 91 recovers the solvent using a counterflow of lean oil and solvent laden, water saturated air. Lean oil is admitted into an upper portion 91a of the counterflow oil absorption unit via line 92. This oil which should be approximately 86° F. is gravity forced downwardly through packing 91b contained in the oil absorption unit 91. The oil flow is indicated by arrow 105. The solvent laden exhaust gas is forced by compressor 101a upwardly through the packing into contact with the downwardly flowing absorbing oil. The exhaust gas flow is indicated by arrow 106. The solvent contained in the exhaust gas is absorbed by the oil and remaining constituents of the exhaust gas which is made up of water vapor and any other gases not absorbed by the oil are exhausted to atmosphere from the top of the oil absorption unit through line 93. The counter flowing oil absorbs and strips all but about 200 parts per million, preferably 100 ppm or less, of the solvent mixture from the exhaust gas. This solvent rich oil passes through the packing and flows out from the bottom of the oil absorption unit via line 110.

The oil absorption unit 91 is a generally cylindrical tank filled with a high surface area steel or stainless steel packing material. A suitable packing material is Goodloe Packing, a packing material made by Glitch Incorporated of Houston, Tex. This packing material is stainless steel and is a high surface area substrate having more than 500 square feet of surface area per cubic foot of packing.

The diameter of the tower will vary depending on the intended flow rate of the gas through the absorber so as to prevent oil entrainment in the gas. The column height should be varied in order to obtain the desired degree of solvent absorption by the counterflowing oil. To accomplish this, the tower should have five to ten theoretical plates. For example, if a 1000 scfm flow rate is desired, the absorption tower should have a diameter of approximately 3 feet and a height of approximately 15 feet. However, if the flow rate is 5000 scfm, the diameter should be approximately 8 feet and the column height should be approximately 30 feet.

One feature important with respect to obtaining the degree of solvent recovery required in the present invention, i.e., approximately all but 200 parts per million, is that the molar ratio of exhaust gas to oil within the column 91 should be maintained at a constant ratio which varies between 4 and 12 to 1. This ratio is controlled by adjusting the flow rate of the oil introduced through line 92 by means of a controller 111. Controller 111 is responsive to the flow rate monitor 103 located in line 102. As the rate of flow in line 102 varies, controller 111 varies the rate of flow of oil through line 92 proportionately to the variation in line 102.

The oil or hydrophobic absorption medium should meet several criteria. This material should have a viscosity of less than 10 centipoise at 86° F., the operating temperature of the absorber. If the viscosity is greater than this, the hydrophobic material tends to bridge the packing and fails to efficiently absorb the solvent. Thus, the preferred viscosity is largely dependent on the surface area of the packing. The material should preferably be odorless in order to be easily handled. The molecular weight of the material should be less than 300 and preferably less than 250. The reason for this lower molecular weight is that the lower the molecular weight, the fewer pounds of material are required to perform the absorbing function. It is preferable that the molecular weight range of the material be fairly narrow and that its boiling point be in excess of 500° F. in order to prevent frothing and evaporation of the material. Furthermore, it is important that the material be biologically inert and chemically stable under the separation conditions. For this reason, an antioxidant is frequently added to the material.

One material which has been found to be suitable in the present invention is a white mineral oil having a viscosity of 7 cp at 86° F., an average molecular weight of 250 and a boiling point of 630° F. Such an oil is sold by Witco under the trade-mark Semtol 40. This is a food grade white mineral oil.

The solvent rich oil having passed through the absorption tower drains through line 110 to pump 112 and is pumped to the stripper 94. Pump 112 forces the oil, which is approximately 86° F. via line 113 through a cross flow heat exchanger 114 which raises the temperature of the oil to approximately 280° F. Line 113 may include a filter 115 to remove any coating solids which may have passed through the water scrubber and were trapped by the absorbing oil. The oil after passing through heat exchanger 114 flows via line 116 to a heater 117 which raises the temperature of the oil to approximately 300° F., the preferred temperature for the stripping process. From heater 117, the oil flows via line 118 into an upper portion 94a of the stripping tower 94.

The stripping tower 94 provides a means to separate the solvent from the absorbing oil to enable both the reuse of the solvent and the reuse of the absorbing oil. The oil introduced at the upper portion of the packing column is gravity fed downwardly through packing 94b in the stripping column. The oil flow is indicated by arrow 121. An inert dry gas in pumped upwardly through line 122 into a lower portion 94c of the stripper tower and through packing 94b at a pressure of about 15 psia. The gas flow is indicated by arrow 123. This inert dry gas mixes with the solvent vapors carried by the absorbing oil and carries the solvent vapor from the oil. The oil is thus stripped of the solvent and is once again a lean oil.

This lean solvent oil drains through line 124 and is forced by pump 125 eventually back to the absorption tower 91.

Optionally, a reflux loop 126 can be added which would bleed oil flowing through line 124 through a heater 127 and introduce the oil back into the stripper tower through line 128 above line 122 into the lower section of packing 94b. Thus, the oil is again subjected to the stripping action of the flowing gas 123. This would aid in maintaining the solvent level in the lean oil at less than 0.001 mole fraction per solvent component.

Pump 125 forces the oil which is at about 300° F. through cross flow heat exchanger 114 which causes the reduction of the temperature of the lean oil to approximately 106° F. The lean oil continues to flow through line 131 and through a cooler 132 where the temperature of the oil is reduced to approximately 86° F. From this point, the oil passes through a pressurized oil supply surge tank 133 and line 134 to the controller 111 where it is allowed to eventually flow through the absorption unit 91.

In order to maintain an adequate supply of oil for use in the absorption unit, regardless of system loss, a makeup feed of oil is provided via line 95 to oil supply surge tank 133. The flow of makeup oil is controlled by controller 135 which is simply a level controller for makeup surge tank 133 and can simply be a flotation valve. When needed, control element 135 permits the passage of pressurized makeup oil through line 95 into the makeup oil surge tank 133.

OPERATION OF THE STRIPPER

The stripper 94 is operated by a crossing flow of oil and air through packing 94b in the stripping column. The type of packing used in the oil absorption tower 91 should be suitable for use in the stripper. The stripping gas is introduced into the bottom portion 94c of the stripping column via line 122. Stripper 94 is designed to remove all but about 0.001 mole fraction of solvent from the oil. If more than this amount of solvent is retained by the oil, particularly with certain polar solvents such as isobutyl alcohol, the oil absorption unit will not function sufficiently. To accomplish this, the stripper should have at least about nine theoretical plates.

The air introduced at line 122 should be a dry, inert gas, such as dry atmospheric air or in the alternative, an inert gas such as nitrogen or helium. The rate of the flow of the gas through line 122 is adjusted by a solenoid valve 136 which is controlled by a controller 137 which varies the flow of gas in response to an input from an oil flow sensor 138 in line 116. The molar ratio of gas to liquid oil passing through the stripper column should be approximately 0.5-0.6 moles of gas per mole of oil.

This gas, generally dry ambient air, passes upwardly through the packing 94b into contact with the downwardly flowing heated oil and is exhausted through line 141 at about 120° F. This exhausted air should contain substantially all of the solvent introduced with the oil into the stripper column 94. This air, now laden with solvent, can be used as is or treated in several different ways.

RECYCLE OF RECOVERED SOLVENT

The solvent laden heated air can be directed through line 141 to a heat exchanger or cooler 142 where it is condensed. The condensed solvent flows through line 143 into a supply tank 144. The liquid solvent in supply tank 144 passes via line 146 into the solvent reservoir 96.

An optional purification step for removing trace amounts of oil from the solvent vapor would be to insert a condenser 145 in line 141 upstream of cooler 142. The gases from the condenser can be directed to cooler 142. This would insure that all trace amounts of oil are separated from the solvent and returned to the stripper. The oil would then be directed to the stripper 94 via line 145a. This will further insure the purity of the solvent.

The gas entering tank 144, primarily the dry carrier gas and saturated solvent vapor, is bled off via line 147 through a T junction 150 and introduced into the coater 10 via line 151. Since the coater is operated at slightly less than atmospheric pressure, i.e., 14.6 psia, the vapors will be drawn in automatically into the coater. This provides a means to maintain a concentration of solvent vapor in the atmosphere of the coater. Junction 150 permits excess gas to be returned to the recovery system through line 152 which merges with line 99 at junction 100. Junction 100 is adjusted to vary the proportion of this gas directed through line 151 and line 152. The junction is adjusted automatically in response to solvent humidity sensors 153 in coater 10. This would cause the controller 153 to increase the percentage of gas diverted by junction 150 into line 151 and coater 10.

If a cooler 142 is not employed in the system, the vapor emitted from the stripper 94 and not condensed in tank 144 can be directly introduced through line 151 into the coating apparatus.

Optionally, the temperature of cooler 142 can be adjusted by controller acting in response to humidity sensors 153 located in coater 10. When the humidity in coater 10 becomes excessive, the temperature of cooler 142 would be decreased, thereby decreasing the amount of solvent vapor entering tank 144 and accordingly, passing through to the painting booth 10 via line 151.

An alternate method of controlling the humidity in the coating booth without altering the activity of cooler 142 is simply condense substantially all of the solvent vapor passing through line 141 and to provide a diverting junction 154 in line 146 to divert the flow from tank 144 through a line 155 into a vaporizer 156. The diverting junction 154 which controls the amount of solvent vapor would be controlled by controller 153. If the humidity became excessive, additional solvent would be diverted from line 146 to vaporizer 156 and accordingly, solvent vapors would flow through line 157 into the coating booth 10. This would increase the percentage of solvent in the coating system, and accordingly, increase the solvent humidity, thus preventing the build up of paint on the walls of the coating booth and enable a smooth, continuous operation of the coater.

Preferably, a large percentage of the liquid solvent is directed to solvent makeup tank 96 through line 146. The solvent can then be reused by adding the solvent to the paint mixing tank reservoir 160 through line 161. The flow through line 161 is controlled by controller 162 which is responsive to a viscosity, flow sensor 163 in the paint mixing tank reservoir 160. Thus, the solvent added to the paint reservoir is controlled to compensate for any solvent lost from the paint returning from the coater through line 164 to pump 170 and through line 169. This will keep the solvent to paint solids ratio in tank 160 constant regardless of the viscosity of the paint added through line 169.

OPERATION OF THE SYSTEM

In operation, and still referring to FIG. 6, workpieces are introduced through an open entrance port, drawing with them a minor insubstantial amount of air (diagrammatically shown by line 165). The workpiece are sprayed with paint from paint tank 160 which is supplied by pump 166 at a relatively high pressure to nozzles 35 positioned on rotating arms 36 via a heater 168 as shown in FIG. 1. Primarily the paint leaves the paint spray booth either on the workpiece itself as indicated diagrammatically by line 167 or excess overspray which collects on the bottom of the booth drawn from the booth through siphon 38 and is returned to the paint tank 160 via line 164 to pump 170 and through line 169. The viscosity of the paint passing from the booth to tank 160 is sensed by a sensor 163 in tank 160 which actuates a controller 162 located in line 161. This will control the flow of makeup solvent from solvent makeup tank 96 through line 171 to pump 172 and through 161 into the paint tank 160, thereby maintaining the viscosity of the paint at a constant level.

As the paint is being sprayed, suction fans 17 and 18 are operated so as to cause air to be pulled from the outside of the openings 47 of the vestibules into the vestibule and into collector slots 48 (FIG. 3). Butterfly valves 80 in each of the vertical legs 58, 59 of the duct system are adjusted so that a relatively even and balanced air flow is maintained through each of the slots 48. By maintaining a balance flow of air through the opposed slots 48 of each vestibule, an even flow of air is maintained over the full cross section area of the vestibule openings 47. This even flow of air across the full cross section of the vestibule functions as an effective air flow barrier to the escape of airborne spray to the entrance and exit ports of the vestibule. Since that air flow barrier extends over the flow area and vertical plane of the vestibule openings, the egress of airborne particles into the outside atmosphere is effectively prevented.

The cabinet 10 is substantially sealed against the inflow of air. The construction of the vestibule and collector slots 48 is such that very nearly all the air pulled into the vestibule to form the air flow barrier is from the outside of the booth. Consequently, there is a minimum of air fow from the interior of the cabinet into the vestibule. Any airborne paint particles or solvents contained within the air and entering the vestibule through air curtain 81 are caused to flow by the air stream into the air collector slots 48. Those airborne particles then are removed from the air stream by liquid scrubber 71 located within ducts 15, 16. That liquid then flows from the system via drain pipe 73 to a flotation tank (not shown). The exhaust air flowing through the duct system is impelled by the exhaust fans 17 and 18 through line 99 to the solvent recovery system.

If a flash tunner is employed, the painted workpiece is carried through the flash tunnel where it is heated and the solvent which is mixed with the coating adhering to the workpiece is evaporated, creating solvent vapor which is drawn into vestibule 12 and through collector slots 48 to form a portion of the air stream flowing through the scrubber 71.

The exhaust stream 99 which is approximately 14.6 psia and 65° F. passes to junction 100 where gas having a temperature of 80° to 120° F. is introduced. This gas is provided from the stripper column 94. This gas increases the temperature of the exhaust gas to about 85° F. From 100, the gas passes through line 102 past a flow rate sensor 103 to a compressor 101a which increases the pressure to 15.3 psia and slightly increases the temperature up to about 87° F. The compressor 101a forces the gas into and through an oil absorption unit 91. Alternately compressor 101a can increase the pressure in the oil absorption unit 91 to about 150 psia in order to improve the efficiency of the absorption unit. If this great a pressure is maintained in the absorption unit, an expander 101b should be included along line 93 to recover some of the energy used to compress the gas in the absorption unit.

Lean absorbing oil flowing downwardly, as indicated by arrow 105, absorbs the solvent in the gas stream. The remaining gas containing a high concentration of water vapor and less than about 200 parts per million solvent vapor is emitted into the atmosphere via line 93.

This lean absorbing oil is introduced into the upper portion of the absorption tower through line 92 at about 86° F. and flows downwardly absorbing the solvent. This solvent rich oil flows from the absorption tower via line 110 to a pump 112 which forces the solvent rich oil through line 113 to a cross flow heat exchanger 114 which raises the temperature of the oil to approximately 280° F. From heat exchanger 114, the oil travels through line 116 to a heater 117 which raises the temperature of the oil to approximately 300° F. This heated oil passes from heater 117 into a packed stripper tower 94 via line 118 where it is gravity forced downwardly through a stripper column 94. Dry, inert gas is forced upwardly from line 122 through the stripper 94 and exits through line 141 taking with it substantially all of the solvent vapor contained in the oil.

The oil drains from the stripper through line 124 and should contain less than about 0.001 mole fraction solvent.

The flow of air through the stripper is controlled by controller 137 which is controlled by a sensor 138 in line 116. The flow rate of the solvent rich oil passing through line 116 is maintained by the controller 137 to keep the mole ratio of air to oil at approximately 0.5 by opening or closing a solenoid valve 136 located in line 122.

The lean oil discharged from the stripper through line 124 can be further purified through an optional reflux loop 126 or pass directly through line 124 to the lean oil pump 125. This oil is approximately 300° F. and passes through cross flow heat exchanger 114 which reduces the temperature to about 106° F. The lean oil then passes to a cooler 132 which reduces the temperature down to 86° F.

Line 131 carries the cooled oil from cooler 132 to an oil tank 133. The level of the tank is maintained constant by a controller 135 which permits the admission of makeup oil through pump 173 through line 95 past controller 135 and into tank 133.

The solvent air mixture emitted from stripper 94 passes through line 141 to a cooler 142. This effectively condenses the material which is transferred via line 143 to a holding tank 144. The vapor phase within this tank is allowed to be drawn from the tank through line 147 and junction 150 into line 151 and into the interior of the coater 10. Junction 150 also bleeds a portion of the solvent vapor through line 152 where it is combined at junction 100 with the exhaust flow going through line 99. This increases the temperatures of the air solvent mixture in line 102 to approximately 85° F.

Cooler 142 can be controlled by a controller 153 which uses a humidity sensor in coater 10 to maintain the percentage of solvent humidity within the paint spray booth within acceptable limits. The higher the solvent humidity within the booth, the less solvent vapor is required to be admitted into the booth. Therefore, as the humidity increases, the temperature of cooler 142 is reduced, thereby decreasing the vapor phase within tank 144 and allowing less vapor to be pulled through line 151 into the booth.

An alternate method to adjust the solvent vapor level in the coater 10 is to maintain a cooler 142 at such level that substantially all the vapor is condensed and drained into tank 144. A diverter junction 154 in drain line 146 from tank 144 which is controlled by controller 153 diverts a portion of the flow in line 146 to an evaporator 156 located in the line 155. Line 155 directs vaporized gas via line 157 to the coater 10. Controlling the amount of solvent diverted to the evaporator alters the amount of solvent drawn into the coater.

Thus, according to the above methods, paint solvent is economically and efficiently recovered and the need to purchase solvent to be added to the paint mixture in order to control its viscosity is significantly reduced. Furthermore, these methods enable one to recover a solvent or proportionally balanced mixture of solvents used in a paint spray system in a state which permits immediate reuse of the solvent. This in turn allows the direct introduction of the recovered solvent into the coater to maintain a high level of solvent vapor in the coater. Finally the energy consumption of this unit is substantially reduced compared to other types of separation. In fact the energy consumption of the process of the present unit can be less than half that of prior art systems.

We claim:

1. A process for the recovery of a blend of solvents in a spray coating system and for reintroducing the recovered blend of solvents back into the spray coating system, said system including a chamber for spray coating of workpieces, a coating supply system for supplying coating material containing hydrocarbon solvent blends to said chamber, an exhaust system for removing coating material overspray from the chamber including a water scrubber to remove airborne coating material particles, and a system for recovering coating material from the chamber and returning it to said coating supply system, said process comprising the steps of:

(a) extracting a stream containing a mixture of air, water vapor and hydrocarbon solvent vapors from said exhaust system at a rate of about 500 to 50,000 standard cubic feet per minute;

(b) subjecting said stream to an absorption process which employs a hydrophobic absorption medium to absorb all but about 200 ppm of said blend of solvent vapors in said stream while the air and water vapor contained in said stream passes through said absorption process;

(c) separating said blend of solvent vapors from said hydrophobic absorption medium by stripping said solvent vapors therefrom with a dry inert gas;

(d) returning the hydrophobic absorption medium to said absorption process, said medium now containing less than about 0.001 mole fraction of any one solvent;

(e) recovering said blend of solvent vapors substantially free of water and said hydrophobic absorption medium; and (f) returning said recovered blend of solvents to said spray coating system (1) by introducing said recovered blend of solvent vapors into said chamber to increase the solvent humidity in said chamber to thereby retard the evaporation of solvent from said coating material supplied to said chamber, (2) by condensing said recovered blend of solvent vapors recovered in step (e) and introducing the condensed blend of solvents to said system as a liquid to return solvent lost in the coating process to the coating supply system, or (3) by a combination of steps (1) and (2), said blend of solvents being returned in substantially the same proportion as in the stream extracted in step (a).

2. The process as claimed in claim 1 wherein said hydrophobic absorption medium comprises oil having a viscosity of less than about 10 cp at 87° F., a molecular weight of less than about 250, and a boiling point of greater than about 500° F.

3. The process of claim 1 wherein said stream extracted in step (a) is at least about 90% saturated with water vapor.

4. The process of claim 1 wherein said hydrophobic absorption medium is hydrogenated white mineral oil.

5. The process of claim 1 wherein said process is carried out between one to ten atmospheres pressure.

6. The process of claim 1 wherein a sufficient amount of said recovered blend of solvents is introduced into said chamber to raise the solvent humidity in the area where the workpiece is being coated to at least about 80% of saturation.

7. The process of claim 1 wherein said workpiece moves continuously through said system.

8. A process for the recovery of a blend of solvents in a spray coating system and for reintroducing the recovered blend of solvents back into the spray coating system, said system including a chamber for spray coating of a moving line of workpieces into and out of the coater, a coating supply system for supplying coating material containing hydrocarbon solvent blends to said chamber, an exhaust system for removing coating material overspray from the chamber including a water scrubber to remove airborne coating material particles, and a system for recovering coating material from the chamber and returning it to the coating supply system, said process comprising the steps of:

(a) extracting a stream containing a mixture of air, water vapor in an amount of at least about 90% of saturation, and hydrocarbon solvent vapors from said exhaust system at a rate of about 500 to 50,000 standard cubic feet per minute;

(b) subjecting said stream to an absorption process operated at about atmospheric pressure at about 85° F. which employs white mineral oil to absorb all but about 200 ppm of said blend of solvent vapors in said stream thereby forming an oil-solvent mixture while the air and water vapor contained in the stream passes through said process and is vented out of said process;

(c) heating the oil-solvent mixture to a temperature of about 300° F.;

(d) passing an upwardly flowing dry gas stream through a downwardly flowing stream of the oil-solvent mixture to separate said blend of solvents from said oil by stripping said solvents out of said oil;

(e) cooling the oil to a temperature of about 85° F. and returning the oil to said absorption process, said oil containing less than about 0.001 mole fraction of any one solvent;

(f) recovering said blend of solvent vapors stripped from said oil substantially free of water and oil;

(g) returning said recovered blend of solvents to said spray coating system (1) by introducing said recovered blend of solvent vapors into said chamber to increase the solvent humidity in said chamber to thereby retard the evaporation of solvents from said coating material supplied to said chamber, (2) by condensing said recovered blend of solvent vapors recovered at step (f) and introducing the condensed blend of solvents to said system as a liquid to return solvent lost in the coating process to the coating supply system, or (3) by a combination of steps (1) and (2), said blend of solvents being returned in substantially the same proportion as in the stream extracted in step (a).

9. The process of claim 8 wherein said absorption step (a) employs a steel packing material having a surface area greater than about 500 square feet per cubic foot of packing.

* * * * *